United States Patent
Ramsl

(10) Patent No.: US 12,380,243 B2
(45) Date of Patent: Aug. 5, 2025

(54) IMAGE SEGMENTATION FOR ANONYMIZATION FOR IMAGE PROCESSING

(71) Applicant: SAP SE, Walldorf (DE)

(72) Inventor: Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 387 days.

(21) Appl. No.: 17/862,091

(22) Filed: Jul. 11, 2022

(65) Prior Publication Data

US 2024/0012936 A1 Jan. 11, 2024

(51) Int. Cl.
*G06F 21/62* (2013.01)
*G06T 7/11* (2017.01)
*G06T 11/60* (2006.01)

(52) U.S. Cl.
CPC ...... *G06F 21/6254* (2013.01); *G06F 21/6209* (2013.01); *G06T 7/11* (2017.01); *G06T 11/60* (2013.01); *G06T 2207/20021* (2013.01)

(58) Field of Classification Search
CPC .......... G06F 21/6254; G06F 21/6209
USPC ........................................... 726/26
See application file for complete search history.

(56) References Cited

U.S. PATENT DOCUMENTS

| | | | |
|---|---|---|---|
| 10,210,551 B1 | 2/2019 | Todd | |
| 11,263,391 B2 | 3/2022 | Potts et al. | |
| 11,675,808 B2 | 6/2023 | Jacob et al. | |
| 11,755,602 B2 | 9/2023 | Smith et al. | |
| 11,837,000 B1 | 12/2023 | Ramsl | |
| 11,947,529 B2 | 4/2024 | Gasper et al. | |
| 12,008,050 B2 | 6/2024 | Brener et al. | |
| 2014/0293366 A1* | 10/2014 | Ozawa | H04N 1/40 358/452 |
| 2015/0003666 A1 | 1/2015 | Wang et al. | |
| 2015/0278593 A1 | 10/2015 | Panferov et al. | |
| 2015/0379343 A1 | 12/2015 | Powell et al. | |
| 2017/0039253 A1 | 2/2017 | Bond | |
| 2017/0371970 A1 | 12/2017 | Bharti et al. | |

(Continued)

OTHER PUBLICATIONS

"Bipartite graph", Wkipedia, [Online]. Retrieved from the Internet: <URL: https://en.wikipedia.org/wiki/Bipartite_graph>, (Accessed Jun. 23, 2022), 10 pgs.

(Continued)

*Primary Examiner* — Anthony D Brown
(74) *Attorney, Agent, or Firm* — SCHWEGMAN LUNDBERG & WOESSNER, P.A.

(57) ABSTRACT

An input image is divided into segments. The segments may be reassembled to reform the input image. The order of the segments may be stored in an encrypted database for which approved applications have the decryption key but users do not. This allows the approved applications to determine the order and reform the input image without allowing users to do the same. To further increase the difficulty of reforming the input image, the segments may be transformed. Example transformations include rotation and mirroring. The encrypted database may store an indication of the transformation applied to each segment. The effort of reforming the input image without access to the database is increased substantially. The reformed input image may be stored in transient memory only, without being stored to long-term storage. Thus, the reformed image cannot be accessed from a file system by unauthorized users.

18 Claims, 10 Drawing Sheets

(56) References Cited

U.S. PATENT DOCUMENTS

| | | | |
|---|---|---|---|
| 2018/0165289 | A1 | 6/2018 | Ramsl et al. |
| 2018/0288079 | A1 | 10/2018 | Muddu et al. |
| 2019/0018904 | A1 | 1/2019 | Russell et al. |
| 2019/0065877 | A1 | 2/2019 | Kalyuzhny et al. |
| 2019/0244094 | A1 | 8/2019 | Ramsl |
| 2020/0134420 | A1 | 4/2020 | Spooner |
| 2020/0293276 | A1 | 9/2020 | Ballinger et al. |
| 2020/0380274 | A1 | 12/2020 | Shin et al. |
| 2021/0224403 | A1* | 7/2021 | Amthor .............. G06T 7/0012 |
| 2021/0232579 | A1 | 7/2021 | Schechter et al. |
| 2021/0342399 | A1 | 11/2021 | Sisto et al. |
| 2021/0365807 | A1 | 11/2021 | Ramsl |
| 2022/0129498 | A1 | 4/2022 | Kilaru et al. |
| 2022/0171008 | A1* | 6/2022 | Zeller .............. G01R 33/5608 |
| 2023/0004977 | A1 | 1/2023 | Cepek et al. |
| 2023/0062307 | A1 | 3/2023 | Ramsl |
| 2023/0096118 | A1 | 3/2023 | Ramsl |
| 2023/0162257 | A1 | 5/2023 | Bhagat et al. |
| 2023/0186020 | A1 | 6/2023 | Rayles |
| 2024/0013004 | A1 | 1/2024 | Ramsl |
| 2024/0028646 | A1 | 1/2024 | Ramsl |

OTHER PUBLICATIONS

Guo, Qingyu, et al., "A Survey on Knowledge Graph-Based Recommender Systems", arXiv:2003.00911v1, (Feb. 28, 2020), 17 pgs.

Karani, Dhruvil, "Introduction to Word Embedding and Word2Vec", Published in Towards Data Science, [Online]. Retrieved from the Internet <URL: https://towardsdatascience.com/introduction-to-word-embedding-and-word2vec-652d0c2060fa>, (Sep. 1, 2018), 8 pgs.

Lopez, Frederico, et al., "Augmenting the User-Item Graph with Textual Similarity Models", arXiv:2109.09358v1, (Sep. 20, 2021), 12 pgs.

U.S. Appl. No. 17/746,451 U.S. Pat. No. 11,837,000, filed May 17, 2022, OCR Using 3-Dimensional Interpolation.

U.S. Appl. No. 17/860,912, filed Jul. 8, 2022, Automatic Data Card Generation.

U.S. Appl. No. 17/870,565, filed Jul. 21, Textual Similarity Model for Graph-Based Metadata.

"U.S. Appl. No. 17/746,451, Notice of Allowance mailed Oct. 12, 2023", 9 pgs.

"U.S. Appl. No. 17/860,912, Examiner Interview Summary mailed Aug. 12, 2024", 2 pgs.

"U.S. Appl. No. 17/860,912, Non Final Office Action mailed Jul. 2, 2024", 16 pgs.

"U.S. Appl. No. 17/860,912, Response filed Aug. 13, 2024 to Non Final Office Action mailed Jul. 2, 2024", 12 pgs.

"U.S. Appl. No. 17/870,565, Examiner Interview Summary mailed Apr. 2, 2024", 3 pgs.

"U.S. Appl. No. 17/870,565, Examiner Interview Summary mailed Dec. 8, 2023", 3 pgs.

"U.S. Appl. No. 17/870,565, Final Office Action mailed Feb. 26, 2024", 20 pgs.

"U.S. Appl. No. 17/870,565, Non Final Office Action mailed Jul. 16, 2024", 21 pgs.

"U.S. Appl. No. 17/870,565, Non Final Office Action mailed Oct. 19, 2023", 19 pgs.

"U.S. Appl. No. 17/870,565, Response filed Apr. 9, 24 to Final Office Action mailed Feb. 26, 2024", 13 pgs.

"U.S. Appl. No. 17/870,565, Response filed Aug. 23, 24 to Non Final Office Action mailed Jul. 16, 2024", 18 pgs.

"U.S. Appl. No. 17/870,565, Response filed Dec. 14, 23 to Non Final Office Action mailed Oct. 19, 2023", 15 pgs.

Ozuysal, Mustafa, et al., "Fast Keypoint Recognition using Random Ferns", IEEE Transactions on Pattern Analysis and Machine Intelligence, vol. 32, (2010), 14 pgs.

* cited by examiner

```
NAME: JOE SCHMOE
ADDRESS: 1212 MAIN STREET
SOCIAL SECURITY NUMBER: 123-45-6789
PHONE NUMBER: 555-555-1212
BIRTH DATE: JANUARY 1, 1990

INVOICE AMOUNT $100.00
INVOICE DATE: FEBRUARY 14, 2022
SALES LOCATION: 5555 2ND AVENUE
```

| SEGMENT TABLE | |
|---|---|
| SEGMENT ID | IMAGE DATA |
| 1 | 123456789ABCDEF |
| 2 | 23456789ABCDEF1 |
| 3 | 3456789ABCDEF12 |
| 4 | 456789ABCDEF123 |
| 5 | 56789ABCDEF1234 |
| 6 | 6789ABCDEF12345 |
| 7 | 789ABCDEF123456 |
| 8 | 89ABCDEF1234567 |

| RECONSTRUCTION TABLE | | | | |
|---|---|---|---|---|
| IMAGE ID | SEGMENT ID | ORDER | ROTATE | MIRROR |
| 1 | 1 | 7 | 90 | VERT |
| 1 | 2 | 3 | 270 | NULL |
| 1 | 3 | 4 | NULL | NULL |
| 1 | 4 | 5 | NULL | HORIZ |
| 1 | 5 | 2 | 180 | NULL |
| 1 | 6 | 6 | NULL | VERT |
| 1 | 7 | 1 | 90 | NULL |
| 1 | 8 | 8 | 180 | HORIZ |

*FIG. 6*

IMAGE SEGMENTATION FOR ANONYMIZATION FOR IMAGE PROCESSING

TECHNICAL FIELD

The subject matter disclosed herein generally relates to anonymizing data, and, more specifically, to image segmentation for anonymization for image processing.

BACKGROUND

Image files may be processed by software to recognize text and depicted objects. A human operator may view an image file and obtain personally identifying information (PII) of a person to whom the image file relates.

BRIEF DESCRIPTION OF THE DRAWINGS

FIG. 3 is an example image, suitable for use in performing image segmentation for anonymization for image processing.

FIG. 5 is an example segmentation of the example image in modified order and with transformations, anonymized for image processing.

FIG. 6 is an example database schema, suitable for use in image segmentation.

DETAILED DESCRIPTION

Figure 1:
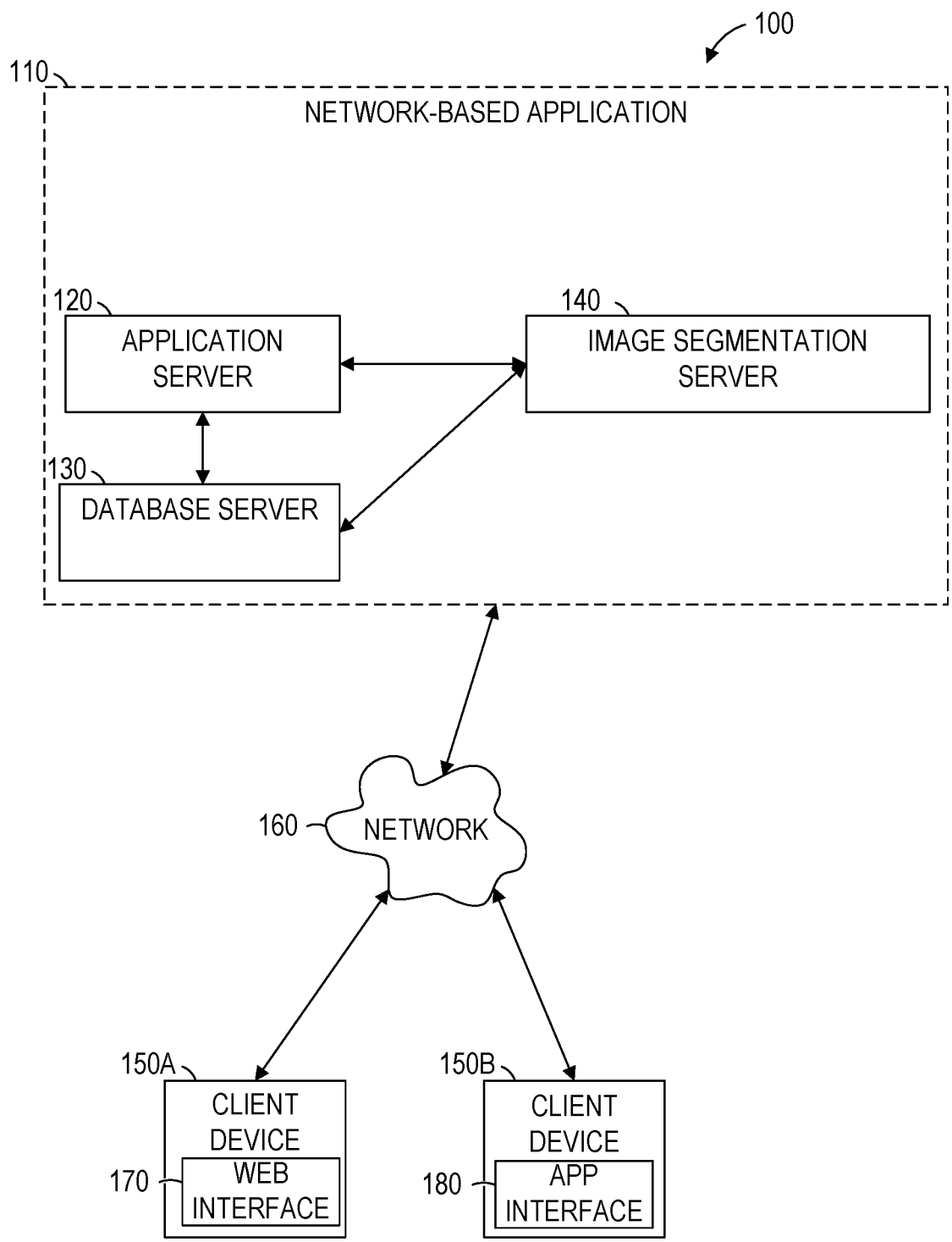
FIG. 1 is a network diagram illustrating an example network environment suitable for image segmentation for anonymization for image processing.

Example methods and systems are directed to image segmentation for anonymization for image processing. Existing systems store images in a format that is both machine- and human-readable. Accordingly, the images can be used for machine-only purposes, such as training machine-learning models, but can also be accessed by human users. The images may include personally identifying information (PII) such as a person's name, address, phone number, and the like. The systems and methods discussed herein protect the PII from human users while allowing the images to be processed by applications.

An input image is segmented when it is divided into smaller images, each of which is a "segment." For example, an input image measuring 200 pixels by 1000 pixels may be divided into 20 segments, each segment measuring 100 pixels square. The segments may be reassembled to reform the input image.

To reform the input image, each segment is placed in its original position. Thus, the segmentation of the example input image into 20 segments may include numbering each segment and using the number of each segment to place the segment in the correct position. If the segments are numbered randomly instead of sequentially, a human cannot easily determine the order of the segments to use to reform the input image. The order of the segments may be stored in an encrypted database for which approved applications have the decryption key but users do not. This allows the approved applications to determine the order and reform the input image without allowing users to do the same.

In the example of 20 segments, a human may be able to reform the input image by inspection of the segments. By using more and smaller segments, the task of reforming the input image is dramatically increased. For example, the 200 pixel by 1000 pixel input image may be divided into 20,000 segments, each segment measuring 10 pixels square.

To further increase the difficulty of reforming the input image, the segments may be transformed. Example transformations include rotation and mirroring. For example, an image may be rotated 0, 90, 180, or 270 degrees and not mirrored, mirrored horizontally, mirrored vertically, or mirrored both horizontally and vertically. The combination of these options gives sixteen different transformations that could be applied to any individual segment and is reversed as part of the image reformation process. The encrypted database may store an indication of the transformation applied to each segment. However, the effort of reforming the input image without access to the database is increased substantially.

The reformed input image may be stored in transient memory (e.g., random-access memory (RAM)) only, without being stored to long-term storage (e.g., a hard drive or solid-state drive (SSD)). Thus, the input image is only available to the application to which the memory is allocated and cannot be later accessed from a file system by a human user. As a result, application access to images is maintained, but a substantial barrier is presented to unauthorized access to the images.

When these effects are considered in aggregate, one or more of the methodologies described herein may obviate a need for certain efforts or resources that otherwise would be involved in performing image processing. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating an example network environment 100 suitable for image segmentation for anonymization for image processing. The network environment 100 includes a network-based application 110, client devices 150A and 150B, and a network 160. The network-based application 110 is provided by an application server 120 in communication with a database server 130, and an image segmentation server 140. The application server 120 accesses application data (e.g., application data stored by the database server 130) to provide one or more applications to the client devices 150A and 150B via a web interface 170 or an application interface 180.

The application server 120, the database server 130, the image segmentation server 140, and the client devices 150A and 150B may each be implemented in a computer system, in whole or in part, as described below with respect to FIG.

10. The client devices 150A and 150B may be referred to collectively as client devices 150 or generically as a client device 150.

The image segmentation server 140 accesses image data from the database server 130, the application server 120, or the client devices 150. For example, a user may be requested to verify their identity by uploading an image of a government-issued identification, such as a driver's license. The user may capture the image using a camera connected to the client device 150A and transfer the image to the image segmentation server 140 via the network 160. The image segmentation server 140 may generate, transform, and reorder segments of the image. The image segments may be stored on the image segmentation server 140 or the database server 130. Data to allow reconstruction of the image from the image segments may be encrypted and stored on the image segmentation server 140 or the database server 130. An encryption key may be provided to the application server 120 to allow access to the image by an application running on the application server 120.

Thus, the application running on the application server 120 is enabled to access the image, but other applications and users of the application server 120 and the image segmentation server 140 are prevented from accessing the original image. As a result, the PII of the user is protected.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the image segmentation server 140, and the client devices 150A-150B are connected by the network 160. The network 160 may be any network that enables communication between or among machines, databases, and devices. Accordingly, the network 160 may be a wired network, a wireless network (e.g., a mobile or cellular network), or any suitable combination thereof. The network 160 may include one or more portions that constitute a private network, a public network (e.g., the Internet), or any suitable combination thereof.

Figure 2:
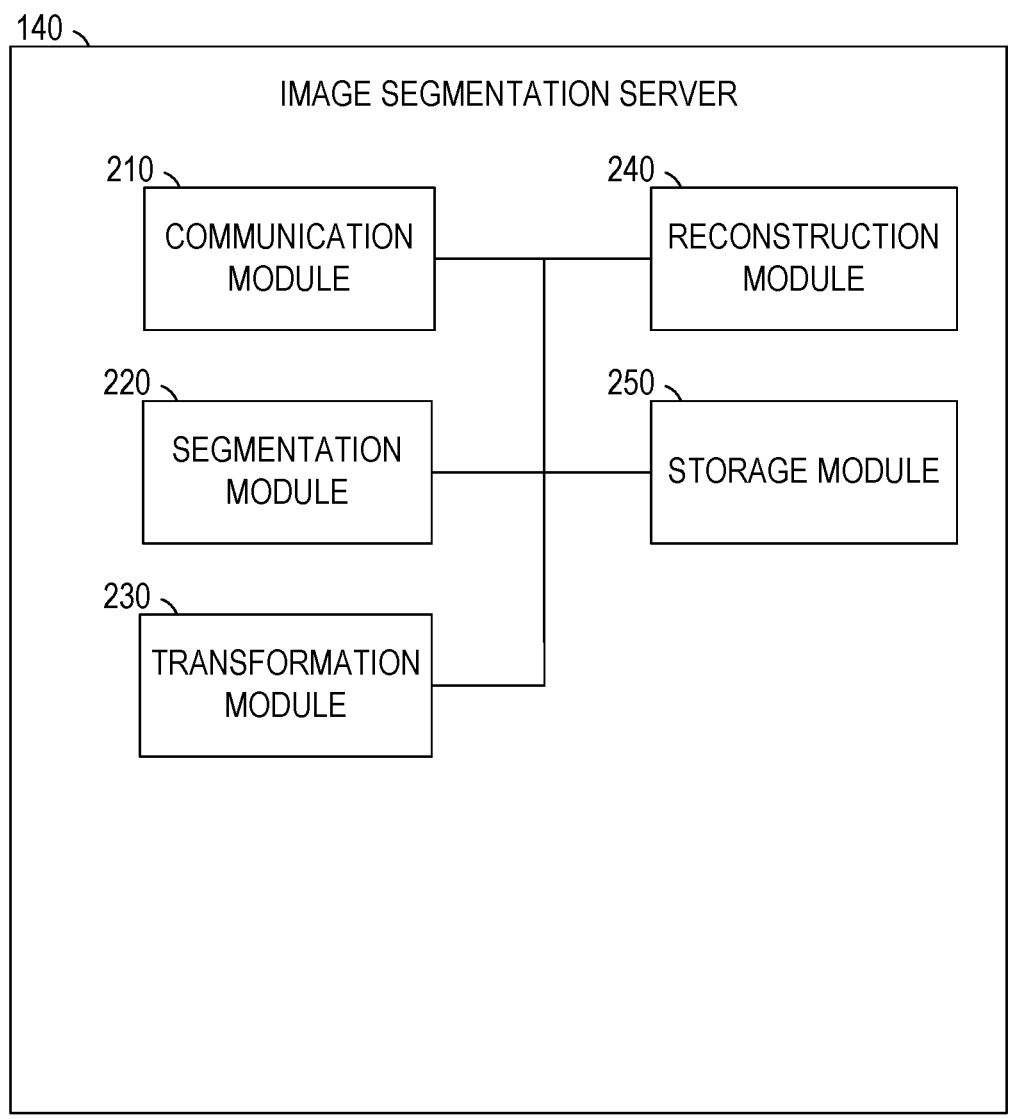
FIG. 2 is a block diagram of an example image segmentation server, suitable for performing image segmentation for anonymization for image processing.

FIG. 2 is a block diagram of an example image segmentation server 140, suitable for performing image segmentation for anonymization for image processing. The image segmentation server 140 is shown as including a communication module 210, a segmentation module 220, a transformation module 230, a reconstruction module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the image segmentation server 140 and transmits data from the image segmentation server 140. For example, the communication module 210 may receive, from the client device 150, an image to be segmented. As another example, the communication module 210 may receive, from the application server 120, a request for access to a segmented image. The image or image segments may be stored on the image segmentation server 140 (e.g., on a hard drive) or in remote storage (e.g., a network storage device such as the database server 130). Communications sent and received by the communication module 210 may be intermediated by the network 160.

The segmentation module 220 divides an image into segments. For example, the image may be divided into a predetermined number of segments (e.g., twelve segments, with the image divided evenly vertically into three strips and each strip divided evenly horizontally into four segments) or segments of a predetermined size (e.g., 100×100-pixel segments). The segments may be approximately or exactly equal in size. For example, an image that is 880×1180 pixels may be divided into twelve segments as described in the example above, but 880 does not divide evenly by three so some segments will be 293×295 pixels and others will be 294×295 pixels.

The segments generated by the segmentation module 220 are transformed by the transformation module 230. For example, the segments may be reordered, rotated, mirrored, inverted (e.g., black and white reversed, RGB values subtracted from 255, or another reversible color inversion), or any suitable combination thereof. Data regarding the applied transformations is stored by the storage module 250.

The reconstruction module 240 reverses the transformations applied by the transformation module 230 to reconstruct one or more images segmented by the segmentation module 220. For example, the data regarding the applied transformations may be accessed from the storage module 250 and used to reorder the segments, un-rotate the segments, un-mirror the segments, un-invert the segments, or any suitable combination thereof in order to reconstruct the original image. Access of the data regarding the applied transformations may make use of an encryption key provided to the image segmentation server 140 by an accessing application. Thus, applications without the encryption key will be unable to properly reconstruct the image.

The reconstructed image may be accessed in-memory by an application. When the application releases the memory or is terminated, the reconstructed image is deleted from the memory. Thus, the reconstructed image is not accessible by unauthorized applications or users.

Trained machine learning models, images, image segments, reconstruction data, or any suitable combination thereof may be stored and accessed by the storage module 250. For example, local storage of the image segmentation server 140, such as a hard drive, may be used. As another example, network storage may be accessed by the storage module 250 via the network 160.

FIG. 3 is an example image 300, suitable for use in performing image segmentation for anonymization for image processing. The example image 300 includes PII such as a person's name, home address, social security number, phone number, and birth date. Additionally, an invoice amount, invoice date, and sales location are included in the example image 300. An application may have legitimate reasons to access the example image 300, such as verification of a user's identity, confirmation of a transaction with the user, accounting of transactions by a business, and the like. Nonetheless, the PII and other data should be protected from malicious access or review by the merely curious. Accordingly, the example image 300 will be processed using image segmentation for anonymization for image processing rather than being stored in its original form.

Figure 4:
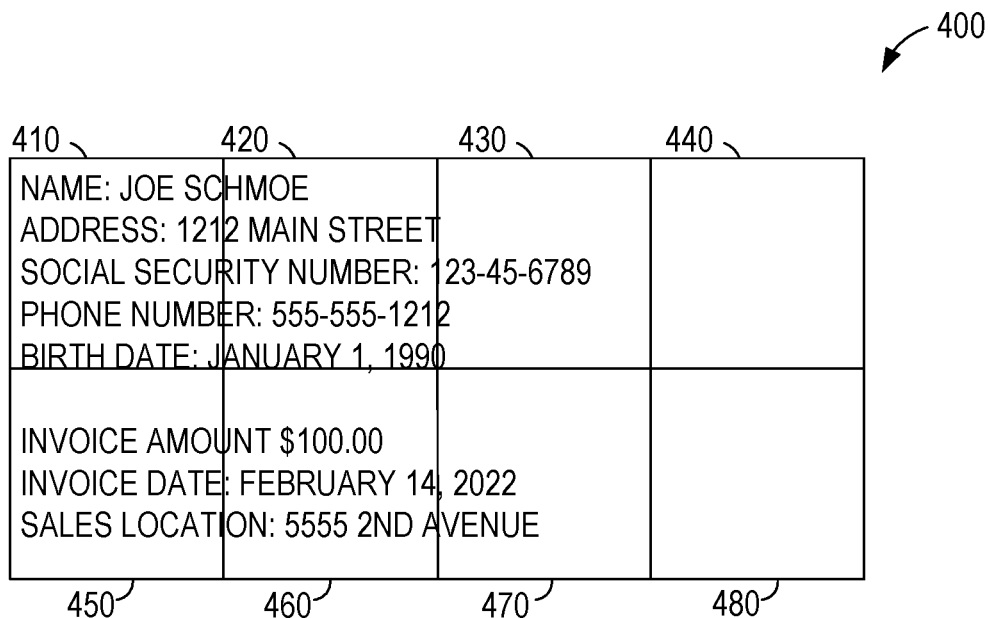
FIG. 4 is an example segmentation of the example image in an original order.

FIG. 4 is an example segmentation 400 of the example image 300 in an original order. The segments 410, 420, 430, 440, 450, 460, 470, and 480 may be stored in separate files in a file system using filenames that indicate their order. For example, "segment1.tif," "segment2.tif," and so on. A user with access to the segments 410-480 can easily recreate the example image 300 by placing them sequentially. Thus, while no segment contains the entirety of a person's name, address, social security number, or birth date, the PII can easily be determined by recombining the segments. Smaller segments may be used to increase the difficulty, but as long as the order is easily determined, a simple programmatic solution enables recovery of the example image 300 by any user.

As can be seen in FIG. 4, each image segment of the plurality of image segments has a horizontal size less than the horizontal image size and a vertical size less than the vertical image size. In various examples, the image is divided into a fixed number of segments (e.g., eight, twelve, or twenty segments). The fixed number of segments may comprise a fixed number of divisions in each of the horizontal and vertical directions (e.g., four horizontal divisions and two vertical divisions in the example of FIG. 4). In these examples, the size of the segments is variable depending on the input image size. Alternatively, the dimensions of the image segments may be fixed (e.g., five pixels square, ten pixels square, or one hundred pixels square). In these examples, the number of segments is variable. The fixed segment size may be selected to be no larger than ten pixels in any dimension, no larger than twenty pixels in any dimension, or no larger than fifty pixels in any dimension. The segment size (e.g., 1×1 pixels, 2×1 pixels, or 4×3 pixels) may be defined in a configuration file (e.g., a Yet Another Markup Language (YAML) file). In some examples, individual segments may have different predefined sizes. For example, a first set of segments may be 1×1 pixels, a second set of segments may be 2×1 pixels, and a third set of segments may be 4×3 pixels. The fraction of segments to be at each predefined size, as well as the dimensions of the predefined sizes, may be included in the configuration file.

When the dimensions of the image segments are fixed, input image sizes that are not exact multiples of the fixed size may receive special handling. For example, an input image that is 105 pixels by 100 pixels may be divided into segments using a fixed size of 10 pixels by 10 pixels. One hundred segments may be created at the fixed size and ten segments may be created that are 5 pixels by 10 pixels, handling the remaining 5 pixels on each row that are left over after as many fixed size segments as possible are created. Alternatively, the input image may be padded with additional pixels to maintain the fixed size of the image segments. For example, the 105 pixel by 100 pixel image may be padded to 110 pixels by 100 pixels, resulting in one hundred ten 10 pixel by 10 pixel segments. The original image size may be stored along with other reconstruction data, allowing the padding pixels to be removed after reconstruction.

Figure 5:
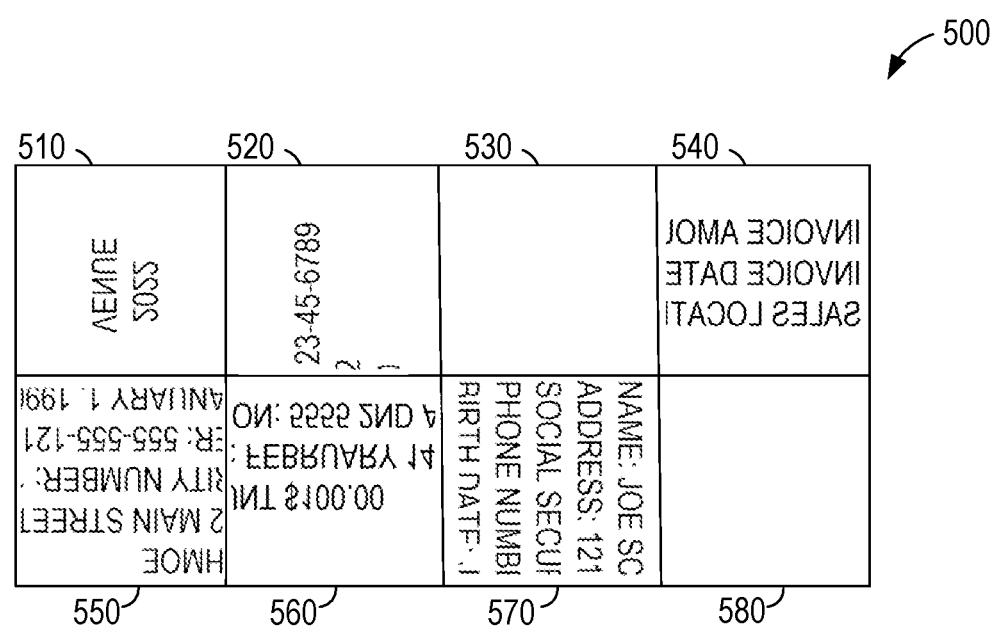

FIG. 5 is an example segmentation of the example image 300 in modified order and with transformations, anonymized for image processing. The eight segments 410-480 of FIG. 4 have been transformed and reordered to generate the segments 510, 520, 530, 540, 550, 560, 570, and 580. The segments 510-580 may be stored as files in a filesystem with names that indicate order or with names that do not indicate order. For example, the file name may be generated based on a hash of the contents of the file. If the files indicate order, the order may be randomized.

The image segment 510 was generated by mirroring and rotating the image segment 470 of FIG. 4. The image segment 520 was generated by rotating the image segment 430. The image segments 530 and 580 were generated from the image segments 440 and 480. The image segment 540 was generated by mirroring the image segment 450. The image segment 550 was generated by rotating the image segment 420. The image segment 560 was generated by rotating and mirroring the image segment 460. The image segment 570 was generated by rotating the image segment 410. The rotations are 90, 180, and 270 degrees. The mirrors are vertical and horizontal. Thus, even with only eight segments, there are eight factorial, or 40,320, different possible orders of the segments. Using only rotation and mirroring as possible transformations, each segment may be transformed in twelve different ways (e.g., rotated 90 degrees and mirrored horizontally, rotated 180 degrees and mirrored vertically, rotated 270 degrees without being mirrored, not transformed, and so on). Thus, there are twelve to the eighth power combinations of transformations, or 429,981,696. Using brute force, there are over 17 trillion ways to recombine the segments to recover the original image.

Efficient recovery of the example image 300 from the image segments 510-580 is facilitated by a data structure that maps the original order of the segments 410-480 to the segments 510-580. Additionally, the data structure may identify the applied transformations. In the example of FIGS. 3-5, the data structure may be a single byte, using four bits to indicate the segment number, two bits to indicate the rotation applied, and two bits to indicate the mirroring applied. Thus, by storing eight bytes of data, the precise one of the 17 trillion possible recombinations is uniquely identified. The data structure may be encrypted, so that reconstruction of the example image 300 is effectively only possible for an application with access to the decryption key.

FIG. 6 is an example database schema 600, suitable for use in image segmentation. The example database scheme 600 includes a segment table 610 and a reconstruction table 640. The segment table 610 includes the rows 630A, 630B, 630C, 630D, 630E, 630F, 630G, and 630H of a format 620. The reconstruction table 640 includes the rows 660A, 660B, 660C, 660D, 660E, 660F, 660G, and 660H of a format 650.

Each row 630A-630H of the segment table 610 stores image data and a segment identifier for an image segment. In the example of FIG. 6, eight segments are stored, but in practice hundreds, thousands, or millions of data segments may be stored in the segment table 610. The segment table 610 may be stored in an unencrypted form, allowing access to many users of the database server 130.

The format 650 indicates that each row 660A-660H of the reconstruction table 640 includes an image identifier, a segment identifier, an order, a rotation value, and a mirror value. The segment identifier of each row 660A-660H corresponds to a segment identifier of each row 630A-630H.

The image identifier indicates which original image the segment is part of Thus, the image data of the rows 630A-630H may be used to reconstruct image 1, since the rows 660A-660H show that segment identifiers 1-8 are part of image 1. The order column indicates the order in which the segments are to be placed in order to reconstruct the image. Thus, while the segments are stored in the segment table 610 in the order 1, 2, 3, 4, 5, 6, 7, 8, the correct ordering to reconstruct the image is 7, 5, 2, 3, 4, 6, 1, 8.

Additionally, the rotate and mirror columns indicate the transformations that were performed on the identified image segment. For example, image segment 1 was rotated 90 degrees and mirrored vertically and image segment 8 was rotated 180 degrees and mirrored horizontally.

The reconstruction table 640 may be encrypted so that only authorized applications are enabled to access the reconstruction data stored therein. Without access to the reconstruction data, the large number of combinations of the image data stored in the segment table 610 would make reconstruction of the original image prohibitive, or even impossible. For example, with small image segments storing individual characters of text, there would be many possible reconstructions of the text that would appear valid without any way to distinguish between the correct reconstruction and the other possibilities.

Figure 7:
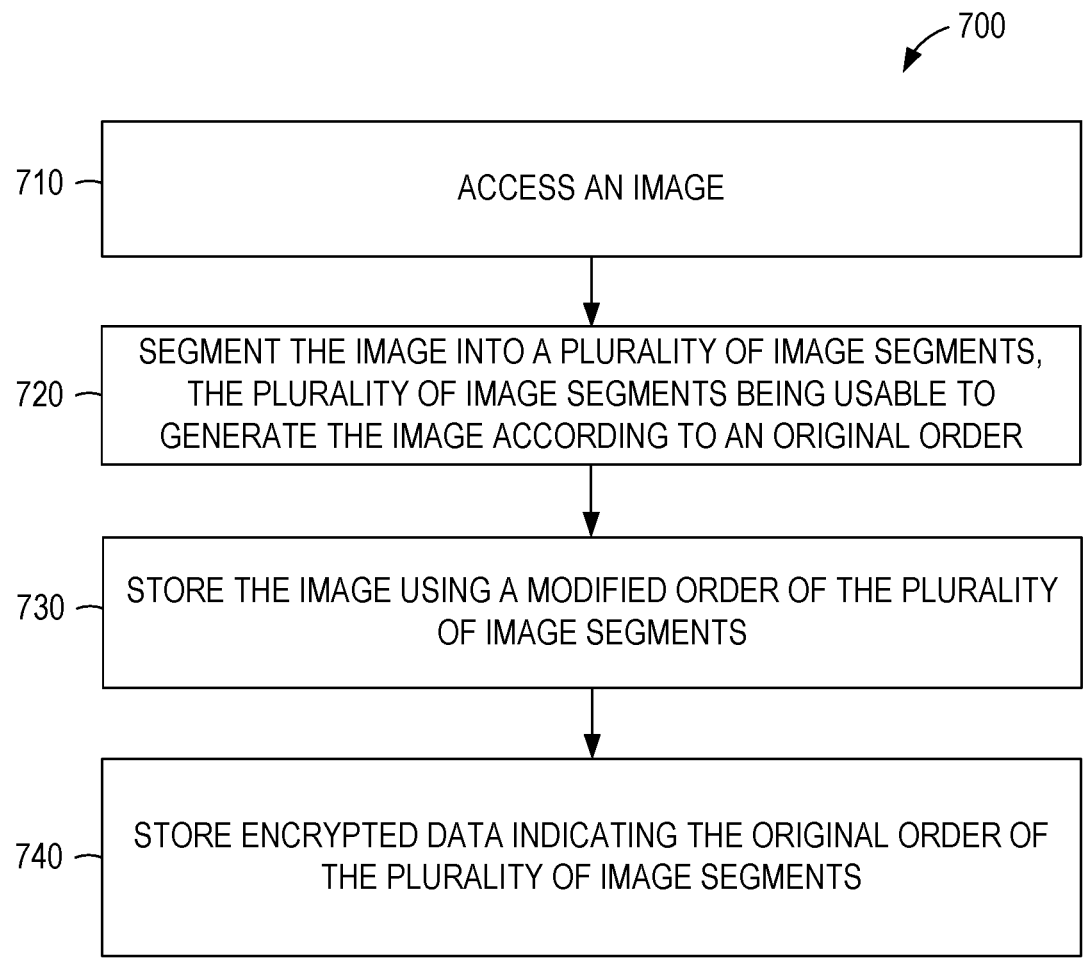
FIG. 7 is a flowchart illustrating operations of an example method suitable for performing image segmentation for anonymization for image processing.

FIG. 7 is a flowchart illustrating operations of an example method 700 suitable for performing image segmentation for anonymization for image processing. The method 700 includes operations 710, 720, 730, and 740. By way of example and not limitation, the method 700 is described as being performed by the image segmentation server 140 of FIG. 1, using the modules of FIG. 2, the images and segments of FIGS. 3-5, and the database schema of FIG. 6.

In operation 710, the segmentation module 220 accesses an image. For example, the image 300 may be provided by the application server 120 to the image segmentation server 140, via the network 160, for anonymization.

The segmentation module 220, in operation 720, segments the image into a plurality of image segments, the plurality of image segments being usable to generate the image according to an original order. For example, the segmentation module 220 may generate the segments 410-480.

In operation 730, the segmentation module 220 stores the image using a modified order of the plurality of image segments. For example, the segmentation module 220 may store the segments 410-480 in the order of the segments 510-580. The transformation module 230 may transform the image segments (e.g., by randomly or pseudo-randomly selecting transformations to apply) prior to storing the segments in the modified order. Alternatively, the image segments may be transformed and stored in the original order. As still another option, the image segments may be stored without order (e.g., by using randomly or pseudo-randomly generated identifiers or by using identifiers generated based on the contents of each segment). The image segments may be stored in the segment table 610 of FIG. 6 or as individual files in a file system.

A transformation applied to a first segment may be different from a transformation applied to a second segment. For example, the first segment may be rotated 90 degrees and the second segment may be horizontally mirrored.

The segmentation module 220, in operation 740, stores encrypted data indicating the original order of the plurality of image segments. For example, symmetric-key or asymmetric-key encryption may be used to encrypt a data structure that maps the original order of the segments to the order in which the segments are stored. Alternatively, the encrypted data may map the original order of the segments to unordered identifiers of the segments. The encrypted data may also indicate the transformations applied to the segments. The transformation and order data may be stored in the reconstruction table 640 of FIG. 6.

Figure 8:
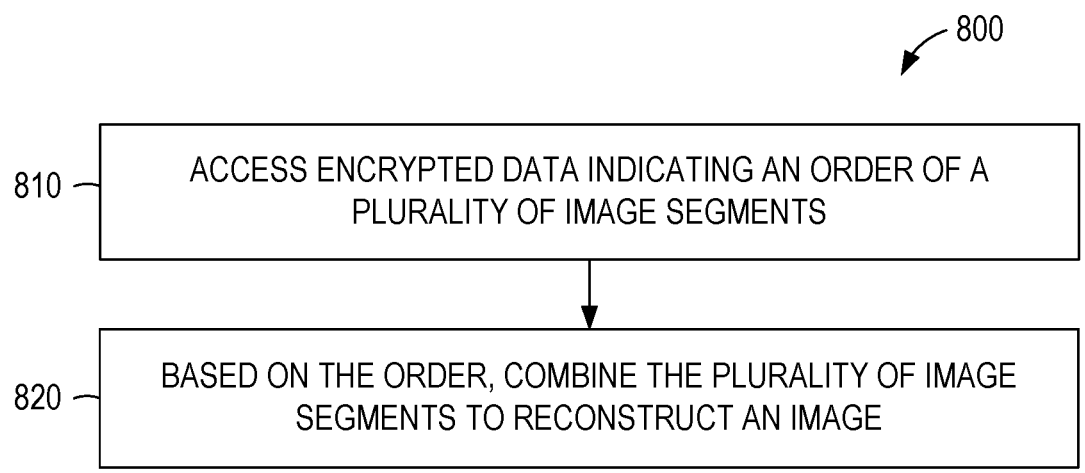
FIG. 8 is a flowchart illustrating operations of an example method suitable for performing image segmentation for anonymization for image processing.

FIG. 8 is a flowchart illustrating operations of an example method 800 suitable for performing image segmentation for anonymization for image processing. The method 800 comprises the operations 810 and 820. By way of example and not limitation, the method 800 is described as being performed by the image segmentation server 140 of FIG. 1, using the modules of FIG. 2, the images and segments of FIGS. 3-5, and the database schema of FIG. 6.

In operation 810, the reconstruction module 240 accesses encrypted data indicating an order of a plurality of image segments. For example, the reconstruction module 240 may be provided a decryption key by the application server 120. Using the decryption key, encrypted data of the database server 130 (e.g., the reconstruction table 640 of FIG. 6) is accessed and decrypted. For example, the encrypted data stored in operation 740 of the method 700 may be accessed. The encrypted data may indicate transformations that were applied to the image segments.

The reconstruction module 240, in operation 820, combines the plurality of image segments based on the order to reconstruct an image. The combining of the plurality of image segments may further be based on indicated transformations. For example, the image segments 510-580 of FIG. 5 may be mirrored or rotated as well as reordered and combined to reconstruct the image 300 of FIG. 3. The reconstructed image may be stored in short-term memory (e.g., RAM) without being stored in persistent storage (e.g., a hard disk), reducing the chance that the image will be subject to unauthorized access. The application server 120 may perform image processing operations using the reconstructed image.

In view of the above-described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: accessing, by one or more processors, an image; segmenting, by the one or more processors, the image into a plurality of image segments, the plurality of image segments being usable to generate the image according to an original order; storing the image using a modified order of the plurality of image segments; and storing encrypted data indicating the original order of the plurality of image segments.

In Example 2, the subject matter of Example 1, wherein: the plurality of image segments comprises a first image segment; the method further comprises: transforming the first image segment using a first transformation; and the encrypted data indicates that the first transformation was applied to the first image segment.

In Example 3, the subject matter of Example 2, wherein: the plurality of image segments comprises a second image segment; the method further comprises: transforming the second image segment using a second transformation different than the first transformation; and the encrypted data indicates that the second transformation was applied to the second image segment.

In Example 4, the subject matter of Examples 2-3, wherein the first transformation is a rotation.

In Example 5, the subject matter of Examples 2-4, wherein the first transformation is a mirroring.

In Example 6, the subject matter of Examples 1-5, wherein: the image is a 2-dimensional image having a horizontal image size and a vertical image size; each image segment of the plurality of image segments has a horizontal size less than the horizontal image size and a vertical size less than the vertical image size.

In Example 7, the subject matter of Examples 1-6, wherein each image segment of the plurality of image segments is no larger than ten pixels in any dimension.

In Example 8, the subject matter of Examples 1-7 includes decrypting the encrypted data; reconstructing, from the plurality of image segments and based on the decrypted data, the image; and performing image processing operations using the reconstructed image without storing the reconstructed image to long-term storage.

Example 9 is a system comprising: a memory that stores instructions; and one or more processors configured by the instructions to perform operations comprising: accessing an image; segmenting the image into a plurality of image segments, the plurality of image segments being usable to generate the image according to an original order; storing the image using a modified order of the plurality of image segments; and storing encrypted data indicating the original order of the plurality of image segments.

In Example 10, the subject matter of Example 9, wherein: the plurality of image segments comprises a first image segment; the operations further comprise: transforming the first image segment using a first transformation; and the encrypted data indicates that the first transformation was applied to the first image segment.

In Example 11, the subject matter of Example 10, wherein: the plurality of image segments comprises a second image segment; the operations further comprise: transforming the second image segment using a second transformation different than the first transformation; and the encrypted data indicates that the second transformation was applied to the second image segment.

In Example 12, the subject matter of Examples 10-11, wherein the first transformation is a rotation.

In Example 13, the subject matter of Examples 10-12, wherein the first transformation is a mirroring.

In Example 14, the subject matter of Examples 9-13, wherein: the image is a 2-dimensional image having a horizontal image size and a vertical image size; each image segment of the plurality of image segments has a horizontal size less than the horizontal image size and a vertical size less than the vertical image size.

In Example 15, the subject matter of Examples 9-14, wherein each image segment of the plurality of image segments is no larger than ten pixels in any dimension.

In Example 16, the subject matter of Examples 9-15 includes decrypting the encrypted data; reconstructing, from the plurality of image segments and based on the decrypted data, the image; and performing image processing operations using the reconstructed image without storing the reconstructed image to long-term storage.

Example 17 is a non-transitory computer-readable medium that stores instructions that, when executed by one or more processors, cause the one or more processors to perform operations comprising: accessing an image; segmenting the image into a plurality of image segments, the plurality of image segments being usable to generate the image according to an original order; storing the image using a modified order of the plurality of image segments; and storing encrypted data indicating the original order of the plurality of image segments.

In Example 18, the subject matter of Example 17, wherein: the plurality of image segments comprises a first image segment; the operations further comprise: transforming the first image segment using a first transformation; and the encrypted data indicates that the first transformation was applied to the first image segment.

In Example 19, the subject matter of Example 18, wherein: the plurality of image segments comprises a second image segment; the operations further comprise: transforming the second image segment using a second transformation different than the first transformation; and the encrypted data indicates that the second transformation was applied to the second image segment.

In Example 20, the subject matter of Examples 18-19, wherein the first transformation is a rotation.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 9:
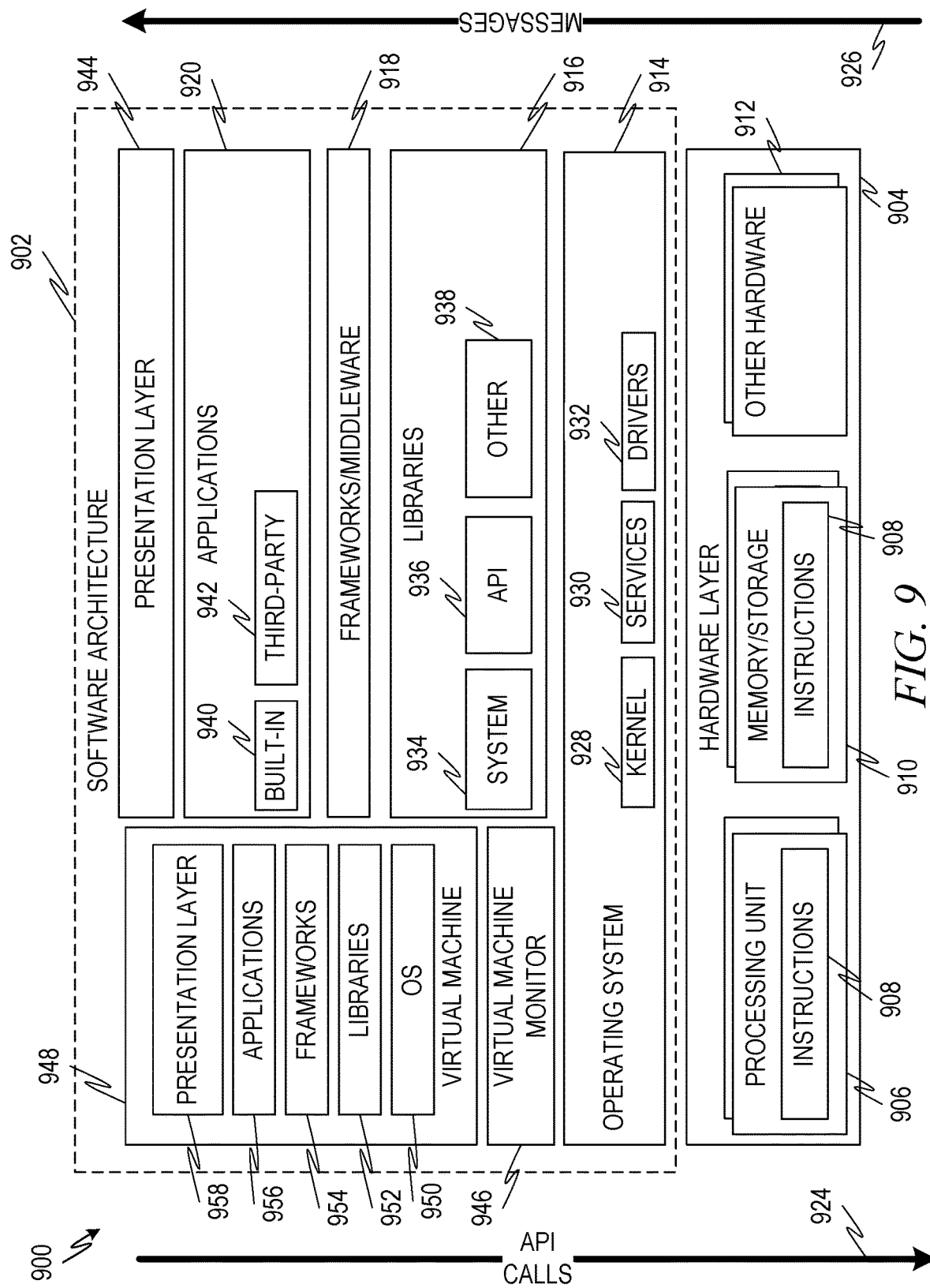
FIG. 9 is a block diagram showing one example of a software architecture for a computing device.

FIG. 9 is a block diagram 900 showing one example of a software architecture 902 for a computing device. The architecture 902 may be used in conjunction with various hardware architectures, for example, as described herein. FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system of FIG. 9.

The representative hardware layer 904 comprises one or more processing units 906 having associated executable instructions 908. Executable instructions 908 represent the executable instructions of the software architecture 902, including implementation of the methods, modules, subsystems, and components, and so forth described herein. The hardware layer 904 may also include memory and/or storage modules 910, which also have executable instructions 908. Hardware layer 904 may also comprise other hardware as indicated by other hardware 912, which represents any other hardware of the hardware layer 904, such as the other hardware illustrated as part of the software architecture 902.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and presentation layer 944. Operationally, the applications 920 and/or other components within the layers may invoke application programming interface (API) calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware 918 layer, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware 918 may provide a higher-level common infrastructure that may be utilized by the applications 920 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™ Windows® Phone, or other mobile computing device operating systems. In this example, the third-party application 942 may invoke the API calls 924 provided by the mobile operating system such as operating system 914 to facilitate functionality described herein.

The applications 920 may utilize built-in operating system functions (e.g., kernel 928, services 930 and/or drivers 932), libraries (e.g., system libraries 934, API libraries 936, and other libraries 938), frameworks/middleware 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine 948 as well as the interface with the host operating system (i.e., operating system 914). A software architecture executes within the virtual machine 948 such as an operating system 950, libraries 952, frameworks/middleware 954, applications 956, and/or presentation layer 958. These layers of software architecture executing within the virtual machine 948 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 10:
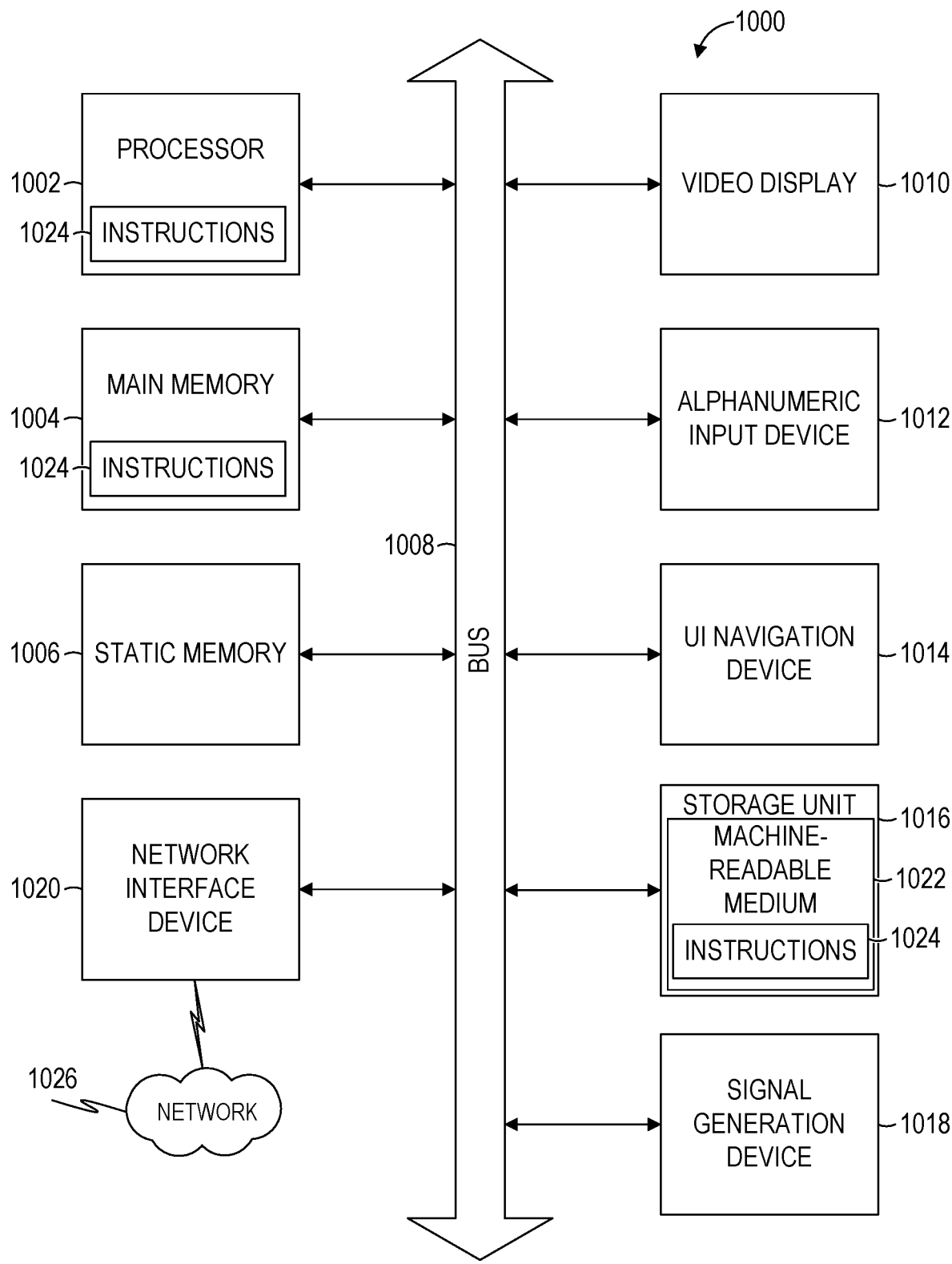
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a storage unit 1016, a signal generation device 1018 (e.g., a speaker), and a network interface device 1020.

Machine-Readable Medium

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in FIG. 10 to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1024 may further be transmitted or received over a communications network 1026 using a transmission medium. The instructions 1024 may be transmitted using the network interface device 1020 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
   accessing, by one or more processors, an image;
   segmenting, by the one or more processors, the image into a plurality of image segments, the plurality of image segments being usable to generate the image according to an original order, the plurality of image segments comprising a first image segment and a second image segment;

transforming the first image segment using a first transformation;

transforming the second image segment using a second transformation different than the first transformation;

storing the image using a modified order of the plurality of image segments; and storing encrypted data indicating the original order of the plurality of image segments, the encrypted data indicating that the first transformation was applied to the first image segment and that the second transformation was applied to the second image segment.

2. The method of claim 1, wherein the first transformation is a rotation.

3. The method of claim 1, wherein the first transformation is a mirroring.

4. The method of claim 1, wherein: the image is a 2-dimensional image having a horizontal image size and a vertical image size; and each image segment of the plurality of image segments has a horizontal size less than the horizontal image size and a vertical size less than the vertical image size.

5. The method of claim 1, wherein each image segment of the plurality of image segments is no larger than ten pixels in any dimension.

6. The method of claim 1, further comprising: decrypting the encrypted data; reconstructing, from the plurality of image segments and based on the decrypted data, the image; and performing image processing operations using the reconstructed image without storing the reconstructed image to long-term storage.

7. A system comprising:
one or more hardware processors; and
a memory that stores instructions that, when executed by the one or more processors, cause the one or more processors to perform operations comprising:
   accessing an image;
   segmenting the image into a plurality of image segments, the plurality of image segments being usable to generate the image according to an original order, the plurality of image segments comprising a first image segment and a second image segment;
   transforming the first image segment using a first transformation;
   transforming the second image segment using a second transformation different than the first transformation;
   storing the image using a modified order of the plurality of image segments; and
   storing encrypted data indicating the original order of the plurality of image segments, the encrypted data indicating that the first transformation was applied to the first image segment and that the second transformation was applied to the second image segment.

8. The system of claim 7, wherein the first transformation is a rotation.

9. The system of claim 7, wherein the first transformation is a mirroring.

10. The system of claim 7, wherein: the image is a 2-dimensional image having a horizontal image size and a vertical image size;
each image segment of the plurality of image segments has a horizontal size less than the horizontal image size and a vertical size less than the vertical image size.

11. The system of claim 7, wherein each image segment of the plurality of image segments is no larger than ten pixels in any dimension.

12. The system of claim 7, further comprising:
decrypting the encrypted data; reconstructing, from the plurality of image segments and based on the decrypted data, the image; and performing image processing operations using the reconstructed image without storing the reconstructed image to long-term storage.

13. A non-transitory computer-readable medium that stores instructions that, when executed by one or more processors, cause the one or more processors to perform operations comprising:
   accessing an image;
   segmenting the image into a plurality of image segments, the plurality of image segments being usable to generate the image according to an original order, the plurality of image segments comprising a first image segment and a second image segment;
   transforming the first image segment using a first transformation;
   transforming the second image segment using a second transformation different than the first transformation;
   storing the image using a modified order of the plurality of image segments; and
   storing encrypted data indicating the original order of the plurality of image segments, the encrypted data indicating that the first transformation was applied to the first image segment and that the second transformation was applied to the second image segment.

14. The non-transitory computer-readable medium of claim 13, wherein the first transformation is a rotation.

15. The non-transitory computer-readable medium of claim 13, wherein the first transformation is a mirroring.

16. The non-transitory computer-readable medium of claim 13, wherein: the image is a 2-dimensional image having a horizontal image size and a vertical image size; and each image segment of the plurality of image segments has a horizontal size less than the horizontal image size and a vertical size less than the vertical image size.

17. The non-transitory computer-readable medium of claim 13, wherein each image segment of the plurality of image segments is no larger than ten pixels in any dimension.

18. The non-transitory computer-readable medium of claim 13, wherein the operations further comprise:
decrypting the encrypted data; reconstructing, from the plurality of image segments and based on the decrypted data, the image; and performing image processing operations using the reconstructed image without storing the reconstructed image to long-term storage.

* * * * *